United States Patent
Lee et al.

(10) Patent No.: US 9,122,506 B2
(45) Date of Patent: Sep. 1, 2015

(54) VIRTUALIZATION APPARATUS AND METHOD FOR CONTROLLING ACCESS TO HARDWARE DEVICE BY I/O REQUEST

(75) Inventors: Sung-min Lee, Suwon-si (KR); Bok-deuk Jeong, Yongin-si (KR); Sang-bum Suh, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1094 days.

(21) Appl. No.: 12/457,700

(22) Filed: Jun. 18, 2009

(65) Prior Publication Data

US 2010/0037232 A1  Feb. 11, 2010

(30) Foreign Application Priority Data

Aug. 6, 2008 (KR) .................. 10-2008-0076820
May 22, 2009 (KR) .................. 10-2009-0044971

(51) Int. Cl.
*G06F 9/46* (2006.01)
*G06F 9/455* (2006.01)

(52) U.S. Cl.
CPC .. *G06F 9/45558* (2013.01); *G06F 2009/45579* (2013.01)

(58) Field of Classification Search
CPC .................. G06F 2009/45579; G06F 9/45558
See application file for complete search history.

(56) References Cited

U.S. PATENT DOCUMENTS

| | | | |
|---|---|---|---|
| 6,415,367 B1 * | 7/2002 | Baxter et al. .................. 711/158 |
| 6,510,514 B1 | 1/2003 | Sedlak | |
| 6,961,941 B1 | 11/2005 | Nelson et al. | |
| 7,130,933 B2 * | 10/2006 | Bissessur et al. ................ 710/22 |
| 7,512,728 B2 * | 3/2009 | Tseng ........................... 710/100 |
| 8,010,719 B2 | 8/2011 | Moriki et al. | |
| 8,146,079 B2 * | 3/2012 | Gupta et al. ...................... 718/1 |
| 8,214,559 B2 | 7/2012 | Moriki et al. | |
| 8,584,129 B1 * | 11/2013 | Czajkowski et al. ......... 718/104 |
| 2005/0102125 A1 | 5/2005 | Tseng | |
| 2005/0198633 A1 | 9/2005 | Lantz et al. | |
| 2007/0300241 A1 | 12/2007 | Prakash et al. | |
| 2008/0028076 A1 | 1/2008 | Gupta et al. | |
| 2008/0074535 A1 | 3/2008 | Ohsuga et al. | |
| 2008/0172499 A1 | 7/2008 | Moriki et al. | |
| 2011/0128436 A1 | 6/2011 | Ohsuga et al. | |
| 2011/0289502 A1 | 11/2011 | Moriki et al. | |

FOREIGN PATENT DOCUMENTS

| | | |
|---|---|---|
| JP | 2001-513596 | 9/2001 |
| JP | 2008-70844 | 3/2006 |
| JP | 2007-219786 | 8/2007 |

(Continued)

OTHER PUBLICATIONS

Suh et al., "Secure Architecture and Implementation of Xen on ARM for Mobile Devices", Presented at Xen Summit Spring 2007, IBM TJ Watson, Apr. 17, 2007.*

(Continued)

*Primary Examiner* — Meng An
*Assistant Examiner* — James J Lee
(74) *Attorney, Agent, or Firm* — Staas & Halsey LLP

(57) ABSTRACT

A virtualization apparatus and a method for controlling the same. In a method for controlling a virtualization apparatus including a plurality of domains, a sub domain transmits an input/output (IO) request for a hardware device to a main domain, and the main domain controls whether or not the IO request accesses the hardware device according to a resource needed to perform the IO request.

17 Claims, 3 Drawing Sheets

(56) References Cited

FOREIGN PATENT DOCUMENTS

| JP | 2008-176482 | 7/2008 |
|----|-------------|--------|
| KR | 10-2008-0090253 | 10/2008 |
| WO | WO 99/08415 | 2/1999 |

OTHER PUBLICATIONS

Background/Summary of Related Art (2 pgs) (in English).
European Search Report for corresponding to European Patent Application No. 09167143 dated Dec. 3, 2009, 11 pages (in English).
Chinese Office Action issued Jun. 29, 2012 in corresponding Chinese Patent Application No. 200910159730.5.
Japanese Office Action mailed Jan. 8, 2013 in corresponding Japanese Application No. 2009-168623.
Chinese Office Action mailed Mar. 4, 2013 in corresponding Chinese Application No. 200910159730.5.
Chinese Office Action issued May 5, 2014 in corresponding Chinese Patent Application No. 200910159730.5.

* cited by examiner

VIRTUALIZATION APPARATUS AND METHOD FOR CONTROLLING ACCESS TO HARDWARE DEVICE BY I/O REQUEST

CROSS-REFERENCE TO RELATED APPLICATIONS

This application claims the benefit of Korean Application Nos. 2008-0076820, filed Aug. 6, 2008, and No. 2009-0044971, filed May 22, 2009, in the Korean Intellectual Property Office, the disclosure of which is incorporated herein by reference.

BACKGROUND

1. Field

One or more embodiments of the present disclosure relate to a virtualization apparatus and a method for controlling the same, and more particularly, to a virtualization apparatus that controls access of input/output (IO) requests, taking into consideration available resources for each device, and a method for controlling the same.

2. Description of the Related Art

In computing, virtualization enables a plurality of operating systems to operate in a single computing environment. If it is assumed that an environment in which each operating system operates is a domain, each domain shares devices installed in the computing apparatus. However, when using the virtualization technology, a main domain among a plurality of domains has a native driver which can access the devices. Accordingly, sub domains may actually access the devices via the native driver of the main domain.

In order to implement such virtualization, a virtual machine monitor (VMM) initially allocates a central processing unit (CPU) time for each domain. Accordingly, if there is a request from a sub domain, the main domain uses a CPU time allocated to the main domain in order to process the request so that a CPU is occupied longer than the time initially allocated to the main domain.

In addition, if malware is installed in a sub domain, the malware sends excessive input/output (IO) requests and thereby the main domain consumes CPU resources while performing the job for the sub domain. That is, the main domain occupies the CPU due to a denial-of-service (DoS) attack from the malware on the sub domain, so performance of principal services or applications of the main domain deteriorates. Furthermore, excessive requests from the malware increase battery or power consumption.

SUMMARY

One or more embodiments of the present disclosure provide a virtualization apparatus which solves deterioration of performance of principal services provided in a virtualization environment, barrier to application performance, battery consumption and so on, and a method for controlling the same.

Additional aspects and/or advantages will be set forth in part in the description which follows and, in part, will be apparent from the description, or may be learned by practice of the disclosure.

According to an embodiment of the present disclosure, there is provided a method for controlling a virtualization apparatus. The virtualization apparatus includes a main domain, one or more sub domains, and one or more hardware devices. The method comprises receiving an input/output (IO) request for a hardware device from a sub domain, and controlling access to the hardware device by the IO request according to a resource needed to perform the IO request.

According to another embodiment of the present disclosure, there is provided a virtualization apparatus comprising a system resource unit, a main domain, and a sub domain. The system resource unit includes a hardware device. The main domain includes a native driver for the hardware device. The sub domain transmits an input/output (IO) request for a hardware device to the main domain, and the main domain controls access to the hardware device by the IO request according to a resource needed to perform the IO request.

BRIEF DESCRIPTION OF THE DRAWINGS

These and/or other aspects and advantages of example embodiments will become apparent and more readily appreciated from the following description of the embodiments, taken in conjunction with the accompanying drawings of which.

DETAILED DESCRIPTION

Figure 1:
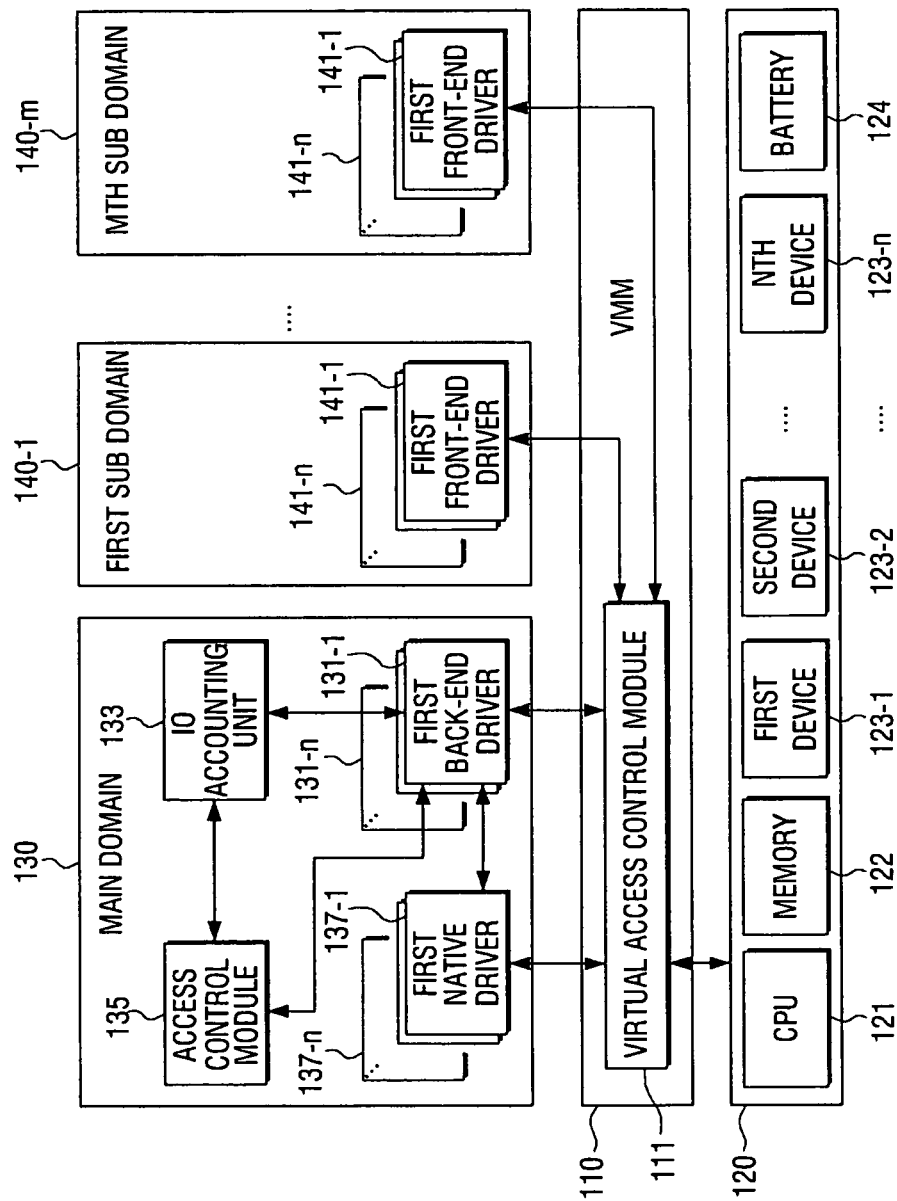
FIG. 1 is a schematic block diagram of a virtualization apparatus, according to an example embodiment.

Reference will now be made in detail to embodiments of the present disclosure, examples of which are illustrated in the accompanying drawings, wherein like reference numerals refer to the like elements throughout. Embodiments are described below in order to explain the present disclosure by referring to the figures.

FIG. 1 is a schematic block diagram of a virtualization apparatus, according to an example embodiment.

Referring to FIG. 1, the virtualization apparatus includes a virtual machine monitor (VMM) 110, a system resource unit 120, a main domain 130, and a plurality of sub domains 140-1, . . . , and 140-$m$.

Physical embodiments of a virtualization apparatus may include, for example, consumer electronic (CE) devices such as personal computers (e.g. desktop computers or laptop computers), audio equipment and mobile devices (e.g. cell phones or smart phones.)

The VMM 110 may execute a plurality of operating systems concurrently. In a virtualization environment using the VMM 110, back-end drivers 131-1, . . . , and 131-$n$ and native drivers 137-1, . . . , and 137-$n$ are located in the main domain 130, and front-end drivers 141-1, . . . , and 141-$n$ are located in respective sub domains 140-1, . . . , and 140-$m$. A virtual access control module 111 in the VMM 110 limits CPU usage for each domain 130, 140-1, . . . , and 140-$m$.

The system resource unit 120 constitutes hardware of the virtualization apparatus, and may include a central processing unit (CPU) 121, a memory 122, a first to $n^{th}$ device 123-1, . . . , and 123-$n$, and a battery 124. It may further include a plurality of other devices or storages or both.

The CPU 121 processes operations in a device upon which a virtualization apparatus is applied.

The memory 122 may store a resource estimation formula for calculating a CPU usage needed to perform an input/output (IO) request, that is, a resource for each device 123-1, . . . , and 123-$n$ or for a plurality of IO requests for each device 123-1, ..., and 123-n. CPU usage refers to a resource to perform an IO request, such as a CPU usage time or a CPU time.

In addition, in the memory 122, an access control policy needed to control accesses to devices corresponding to IO requests output from the plurality of sub domains 140-1, ..., and 140-m are loaded and stored. The access control policy includes a reference value to control the $m^{th}$ sub domain 140-m to access the $n^{th}$ device 123-n according to an IO request transmitted from the $m^{th}$ sub domain 140-m, or to schedule an access method thereof.

The access control policy may set a threshold value for IO request size or CPU usage available for each device 123-1, ..., and 123-n installed in the system resource unit 120. In other words, the threshold value may be a maximum value (or a reference value) of the IO request size or the CPU usage below which the access control policy allows access to each device 123-1, ..., and 123-n. For example, the access control policy may set a maximum value (or a reference value) of the available CPU usage for a predetermined period of time for an IO request by each front-end driver 141-1, ..., and 141-n, wherein the predetermined period of time may represent a CPU scheduling period. Hereinbelow, a reference set for each device 123-1, ..., and 123-n is described as an example.

The first to $n^{th}$ devices 123-1, ..., and 123-n are IO devices that perform a function for inputting information to a device, a function for outputting information from a device, or a function for performing input and output, including for example network interface cards, storages, memory technology devices (MTDs), and console devices.

The battery 124 is included to supply power to the system resource unit 120.

The main domain 130 and the one or more sub domains 140-1, ..., and 140-m provide virtualization environments which are operated by separate operating systems. The main domain 130 and the one or more sub domains 140-1, ..., and 140-m may also operate in the same operating system. Examples of operating systems include Palm, Symbian OS, Android, Windows Mobile, Windows®, Linux, Unix™, and the disk operating system (DOS).

The main domain 130 provides principal services such as Internet banking, security services, and voice calls, or main applications. The main domain 130 provides the plurality of sub domains 140-1, ..., and 140-m as well as the main domain 130 with paths to access the first to $n^{th}$ devices 123-1, ..., and 123-n. Accordingly, the main domain 130 functions as a server, and the plurality of sub domains 140-1, ..., and 140-m function as clients.

To this end, the main domain 130 may include first to $n^{th}$ back-end drivers 131-1, ..., and 131-n, an IO accounting unit 133, an access control module 135, and first to $n^{th}$ native drivers 137-1, ..., and 137-n.

The first to $n^{th}$ back-end drivers 131-1, ..., and 131-n each provide a communication path between the main domain 130 and the plurality of sub domains 140-1, ..., and 140-m, and correspond respectively to the first to $n^{th}$ devices 123-1, ..., and 123-n. The first to $n^{th}$ back-end drivers 131-1, ..., and 131-n each provide the IO accounting unit 133 with IO requests input from the plurality of sub domains 140-1, ..., and 140-m.

For example, if an application (not shown) on the first sub domain 141-1 requests the use of the first device 123-1, the first front-end driver 141-1 transmits an IO request for the first device 123-1, and the first back-end driver 131-1 receives the IO request and transmits the IO request to the IO accounting unit 133. The first device 123-1 is a target device.

IO accounting unit 133 provides a formula to estimate how much CPU resources are used for the IO request. If the memory 122 does not have a formula for a newly installed device or if there is a request for generating a new formula, the IO accounting unit 133 generates a resource estimation formula. For example, the IO accounting unit 133 newly generates a resource estimation formula: when an apparatus to which a virtualization environment is applied is manufactured; when a new device is installed in the system resource unit 120; or when the user requests an update of the existing formula.

If there is a request for generating a formula, the IO accounting unit 133 calculates a formula for estimating how much resources each device 123-1, ..., and 123-n uses for the IO request. A method for calculating the formula is as follows.

If $m^{th}$ sub domain 140-m transmits IO requests of diverse sizes, which are predetermined for each device 123-1, ..., and 123-n, to the main domain 130, the IO accounting unit 133, based on resources, for example a CPU time, needed to process the IO requests of diverse sizes, outputs a resource estimation formula of $m^{th}$ sub domain 140-m for each device 123-1, ..., and 123-n or each front-end drivers 141-1, ..., and 141-n.

That is, if the $n^{th}$ front-end driver 141-n transmits test packets of diverse sizes to the $n^{th}$ back-end driver 131-n, the IO accounting unit 133 tests the amount of variance of a CPU time taken for the $n^{th}$ native driver 137-n or the $n^{th}$ device 123-n to process each packet, so a regression formula, that is, a resource estimation formula is output.

The resource estimation formulas for the devices 123-1, ..., and 123-n are set in the access control module 135 or memory 122, and are used for device access control when driving each device 123-1, ..., and 123-n.

The access control module 135 controls IO requests received from the sub domains 140-1, ..., and 140-m to access the main domain 130 or the devices 123-1, ..., and 123-n using the resource estimation formulas for the devices 123-1, ..., and 123-n. That is, the access control module 135 may control access of the IO request or schedule an access by comparing a resource needed to perform the IO request calculated by a corresponding resource estimation formula with a stored reference value.

In particular, if an IO request for the $n^{th}$ device 123-n is received from the $m^{th}$ sub domain 140-m, and a resource needed to perform the IO request is greater than a reference value for the $n^{th}$ device 123-n stored in the memory 122, the access control module 135 may process an amount of the IO request corresponding to the reference value, then block the remaining amount of the IO request, and store the remaining amount of the IO request in an additional storage device such as a queue (not shown).

For example, if it is assumed that a resource needed to process a packet associated with an IO request for the first device 123-1 is 10 msec, and a reference value for the first device 123-1 is 2 msec, the access control module 135 firstly processes the amount of the IO request corresponding to 2 msec, and blocks the remaining amount of the IO request corresponding to 8 msec while processing the amount of the IO request corresponding to 2 msec. After finishing processing of the amount of the IO request corresponding to 2 msec, the access control module 135 processes 2 msec from among the remaining 8 msec, and blocks the remaining 6 msec. The remaining 6 msec may be processed in the same manner.

The access control module 135 may use the IO request size as the resource needed to perform the IO request. For example, if it is assumed that a packet size associated with an IO request for the first device 123-1 is 4 MB(mega byte), and a reference value for the first device 123-1 is 1 MB, the access control module 135 firstly processes the amount of the IO request corresponding to 1 MB, and blocks the remaining amount of the IO request corresponding to 3 MB while processing the amount of the IO request corresponding to 1 MB. After finishing processing of the amount of the IO request corresponding to 1 MB, the access control module 135 processes 1 MB from among the remaining 3 MB, and blocks the remaining 2 MB. The remaining 2 MB is processed in the same manner.

Alternatively, if a resource needed to perform an IO request is k times as much as a reference value stored in the memory 122, the access control module 135 may determine that the IO request is an attack by malware and may intercept the IO request so that the IO request cannot be processed. The value 'k' may be set or modified by a system designer or the user. Malware may be installed in at least one of the sub domains 140-1, . . . , and 140-$m$.

The first to $n^{th}$ native drivers 137-1, . . . , and 137-$n$ are actual drivers accessible to the first to $n^{th}$ devices 123-1, . . . , and 123-$n$ installed in the system resource unit 120. The first to $n^{th}$ native drivers 137-1, . . . , and 137-$n$ correspond to the first to $n^{th}$ devices 123-1, . . . , and 123-$n$, respectively.

The first to $m^{th}$ sub domains 140-1, . . . , and 140-$m$ (m is a constant) may access the main domain 130 and the first to $n^{th}$ devices 123-1, . . . , and 123-$n$ via the first to $n^{th}$ front-end drivers 141-1, . . . , and 141-$n$. The first to $n^{th}$ back-end drivers 131-1, . . . , and 131-$n$ and the first to $n^{th}$ front-end drivers 141-1, . . . , and 141-$n$ are associated with the first to $n^{th}$ native drivers 137-1, . . . , and 137-$n$ and the first to $n^{th}$ devices 123-1, . . . , and 123-$n$, and may be automatically generated when the first to $n^{th}$ native drivers 137-1, . . . , and 137-$n$ of the first to $n^{th}$ devices 123-1, . . . , and 123-$n$ are installed.

Figure 2:
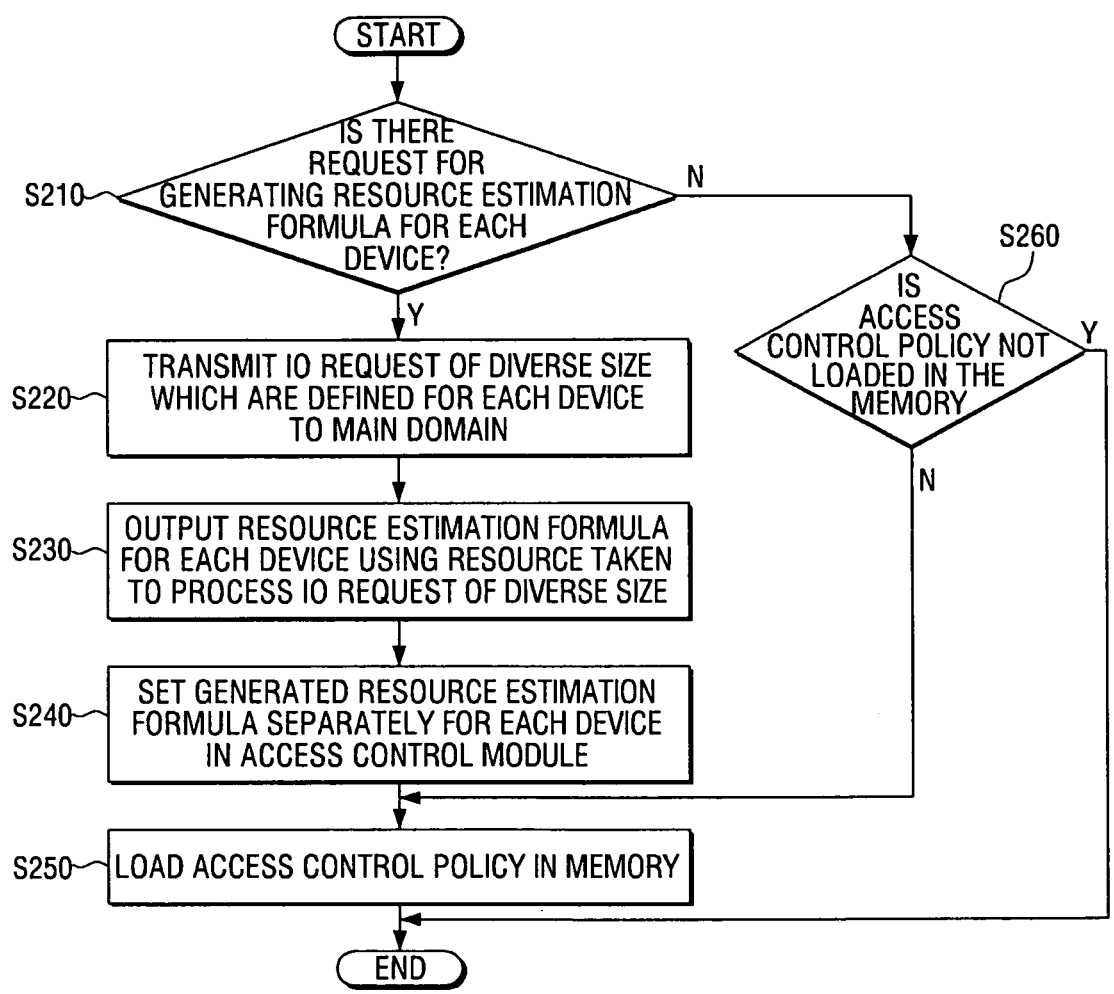
FIG. 2 is a flow chart illustrating initialization for access control in a main domain, according to an example embodiment.

FIG. 2 is a flow chart illustrating initialization for access control in a main domain, according to an example embodiment.

Referring to FIGS. 1 and 2, if there is a request for generating a resource estimation formula for the $n^{th}$ device 123-$n$ (S210-Y), the $n^{th}$ front-end driver 141-$n$ transmits IO requests of diverse sizes which are defined for the $n^{th}$ device 123-$n$ to the $n^{th}$ back-end driver 131-$n$ of the main domain 130, and the $n^{th}$ back-end driver 131-$n$ provides the IO accounting unit 133 with the IO requests of diverse sizes (S220).

Subsequently, the IO accounting unit 133 generates a resource estimation formula for the $n^{th}$ device 123-$n$ using resources taken to process the IO requests of diverse sizes (S230). In addition, the IO accounting unit 133 calculates the sum of data (for example, CPU time) which a certain domain requests to use a certain device for every CPU scheduling period. Operations S210 to S230 are performed to generate resource estimation formulas for the first to $n^{th}$ devices 123-1, . . . , and 123-$n$, but for convenience of description, only the $n^{th}$ device 123-$n$ is recited here.

If the resource estimation formulas for the first to $n^{th}$ devices 123-1, . . . , and 123-$n$ are generated, the access control module 135 sets the generated resource estimation formulas separately for each device 123-1, . . . , and 123-$n$ in the access control module 135 or the memory 122 (S240).

The access control module 135 loads a access control policy in the memory 122 (S250).

In operation S210, if there is no request for generating a resource estimation formula for the $n^{th}$ device 123-$n$ (S210-N), the access control module 135 determines whether or not an access control policy is loaded in the memory 122 (S260). If an access control policy is not loaded in the memory 122 (S260-N), the access control module 135 loads an access control policy in the memory 122. By this process, initialization for access control in response to an IO request is completed.

Such a virtualization apparatus and a method for controlling the same according to one or more embodiments of the present disclosure can solve performance deterioration of principal services or applications, and minimize unnecessary battery consumption.

Figure 3:
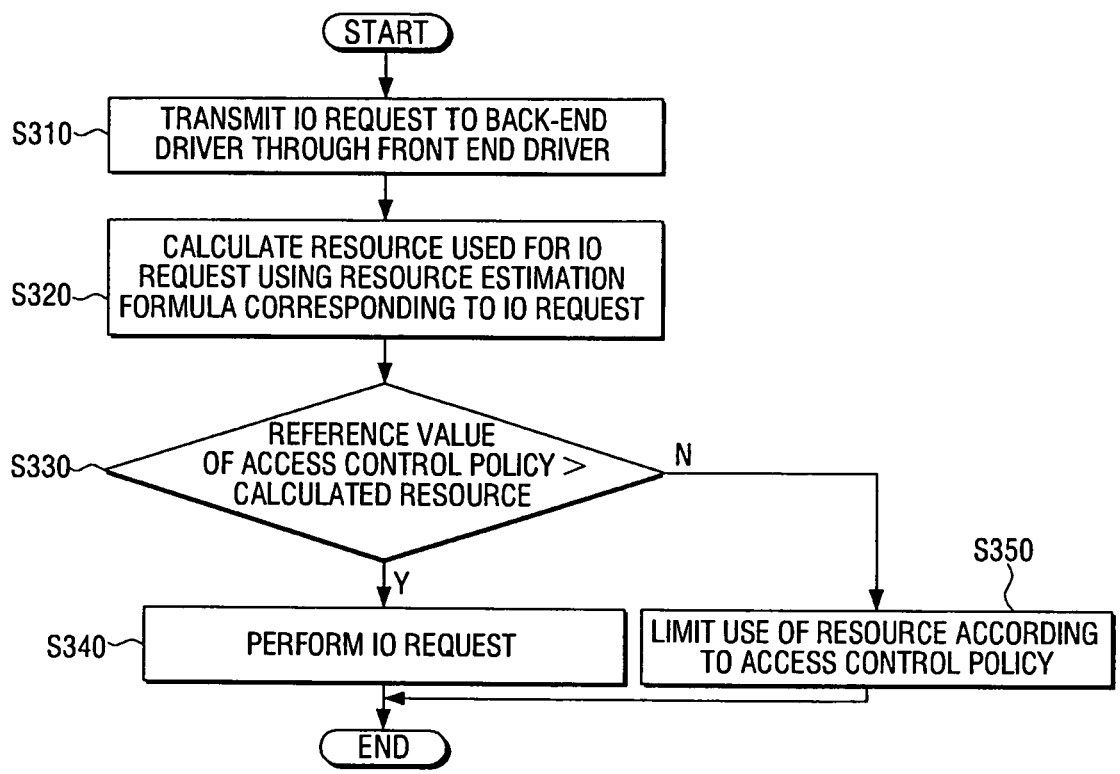
FIG. 3 is a flow chart illustrating an access control method of a virtualization apparatus, according to an example embodiment.

FIG. 3 is a flow chart illustrating an access control method of a virtualization apparatus, according to an example embodiment.

Referring to FIGS. 1 to 3, if an IO request is transmitted from one of the front end drivers 141-1, . . . , and 141-$n$ of the first to $m^{th}$ sub domains 140-1, . . . , and 140-$m$ to the main domain 130 (S310), the IO accounting unit 133 calculates resources used for the IO request using a resource estimation formula corresponding to the IO request (S320).

For example, if the $n^{th}$ front-end driver 141-$n$ transmits an IO request, the $n^{th}$ back-end driver 131-$n$ receives the IO request and transmits the IO request to the IO accounting unit 133. The IO accounting unit 133 reads out a resource estimation formula corresponding the $n^{th}$ device 123-$n$ from the memory 122, and puts the IO request into the read-out resource estimation formula, so a resource used for the IO request is calculated. In addition, the IO accounting unit 133 calculates the sum of data (CPU time) which a certain domain requests to use a certain device for every CPU scheduling period. The sum of the data is reset to be 0 in the next CPU scheduling period.

The access control module 135 compares the resources calculated in operation S320 with a reference value of an access control policy corresponding to the $n^{th}$ device 123-$n$, which is loaded in the memory 122, and thereby determines whether or not the $n^{th}$ device 123-$n$ can perform the IO request (S330). The access control policy may specify how much CPU time the main domain 130 can use to process the IO request for every CPU scheduling period so that a certain sub domain can use a certain device provided by the main domain 130.

If the calculated resource is smaller than the reference value corresponding to the $n^{th}$ device 123-$n$ (S330-Y), the access control module 135 determines that the $n^{th}$ device 123-$n$ can perform the IO request, and thus the IO request can be performed (S340). For example, the access control module 135 transmits the IO request to the $n^{th}$ device 123-$n$ through the $n^{th}$ back-end driver 131-$n$ and the $n^{th}$ native driver 137-$n$ so that an operation corresponding to the IO request can be performed.

Accordingly, operation S340 is performed when the sum of data (CPU time) which a certain domain requests to use a certain device for every CPU scheduling period is smaller than the reference value specified in the access control policy.

Alternatively, if the calculated resource is higher than the reference value corresponding to the $n^{th}$ device 123-$n$ (S330-N), the access control module 135 limits the use of the resource according to the access control policy (S350). In particular, the access control module 135 may sequentially process an amount of the IO request up to the reference value allowed in the access control policy for every scheduling period, or block the IO request for a predetermined period of time. For example, the access control module 135 may sequentially perform the IO request up to the IO request size or the CPU time of the access control policy, which is loaded in the memory 122. In addition, if it is determined that the IO request is a malware attack, the access control module 135 intercepts access of the IO request so that access to the hardware device by the IO request (for example, the $n^{th}$ device 123-$n$) can be controlled.

In embodiments of the present disclosure, the access control module 135 or a sensor (not shown) may check the remaining life of a battery, and the access control policy may include an access control policy commensurate with the remaining life of the battery. If the checked remaining battery life reaches the remaining battery life threshold set in the access control policy, the access control module 135 may limit the CPU usage. In the access control policy, the different remaining battery life for each device 123-1, . . . , and 123-$n$ may be set. The access control module 135 may limit the CPU usage for each device 123-1, . . . , and 123-$n$ taking into consideration the different remaining battery life.

Furthermore, the main domain 130 may include an invasion detection module (not shown) which dynamically detects invasion of malicious program code such as malware. If the invasion detection module detects invasion of malicious program code, the access control module 135 may not allow access of the IO request.

As described above, according to embodiments of the present disclosure, available resources for each device 123-1, . . . , and 123-$n$ are preset, and access to the main domain 130 or access to each device 123-1, . . . , and 123-$n$ is controlled according to the IO request, so fine-grained IO access control (FGAC) may be provided. That is, in order to provide the FGAC, embodiments of the present disclosure can limit use of resources such as a CPU based on the access control policy predetermined for each device 123-1, . . . , and 123-$n$ when the main domain 130 processes the IO request from the $m^{th}$ sub domain 140-$m$.

Moreover, deterioration of system performance and unnecessary battery and CPU consumption caused due to excessive IO requests of malware installed in the virtualization apparatus may be prevented. That is, access to devices can be restricted or blocked according to IO requests so that unnecessary waste of resources can be prevented.

Furthermore, as access control divided according to each device 123-1, . . . , and 123-$n$ is provided, there are no further resource restrictions placed on devices that do not receive denial-of-service (DoS) attacks. In addition, principal applications can operate using optimum resources.

In particular, if the virtualization apparatus is a consumer electronics device having limited resources such as a cell phone, a DoS attack may prove fatal. Accordingly, the virtualization apparatus can be protected from DoS attacks by supporting FGAC, that is, access control for each device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method for controlling a virtualization apparatus comprising a main domain, one or more sub domains, and one or more hardware devices, the method comprising:
   receiving an input/output (IO) request for a hardware device from a sub domain; and
   controlling access to the hardware device by the IO request according to a resource needed to perform the IO request, wherein the resource needed to perform the IO request is a central processing unit (CPU) time needed to perform the IO request,
   wherein the controlling comprises:
      prior to processing the IO request, comparing the resource needed to perform the IO request with a reference value which is a threshold value for CPU usage available for the hardware device;
      prior to processing the IO request, determining an amount of the IO request to be processed corresponding to the reference value when the resource needed to perform the IO request is greater than the reference value and corresponding to the amount of the IO request when the resource needed to perform the IO request is less than or equal to the reference value; and
      processing the determined amount of the IO request to be processed during a scheduling period and, when the resource needed to perform the IO request is greater than the reference value, blocking a remaining amount of the IO request during the processing of the determined amount of the IO request in the scheduling period and then processing the remaining amount of the IO request in a subsequent scheduling period.

2. The method according to claim 1, wherein the virtualization apparatus comprises
   a plurality of sub domains; and
   a plurality of hardware devices.

3. The method according to claim 1, wherein the resource needed to perform the IO request further comprises a size of the IO request.

4. The method according to claim 1, further comprising:
   checking a remaining capacity of a battery; and
   blocking the access to the hardware device if the remaining capacity of the battery is less than a second reference value.

5. The method according to claim 1, further comprising:
   detecting a malicious program code; and
   blocking an access to the hardware device by the IO request caused by the malicious program code.

6. The method according to claim 1, wherein the controlling further comprises:
   prior to processing the IO request, determining an attack by malware when the resource needed to perform the IO request is greater than or equal to a predetermined value; and
   intercepting the IO request when the attack by malware is determined.

7. A method for controlling a virtualization apparatus comprising a main domain, one or more sub domains, and one or more hardware devices, the method comprising:
   receiving an input/output (IO) request for a hardware device from a sub domain; and
   controlling access to the hardware device by the IO request according to a resource needed to perform the IO request, wherein the resource needed to perform the IO request is a maximum value of a CPU time allowed to perform the IO request,
   wherein the controlling comprises:
      prior to processing the IO request, comparing the resource needed to perform the IO request with a reference value which is a threshold value for CPU usage available for the hardware device;
      prior to processing the IO request, determining an amount of the IO request to be processed corresponding to the reference value when the resource needed to perform the IO request is greater than the reference value and corresponding to the amount of the IO request when the resource needed to perform the IO request is less than or equal to the reference value; and processing the determined amount of the IO request to be processed during a scheduling period and, when the resource needed to perform the IO request is greater than the reference value, blocking a remaining amount of the IO request during the processing of the determined amount of the IO request in the scheduling period and then processing the remaining amount of the IO request in a subsequent scheduling period.

8. A virtualization apparatus, comprising:

a system resource unit comprising a hardware device;

a main domain comprising a native driver for the hardware device; and a sub domain to transmit an input/output (IO) request for the hardware device to the main domain, wherein the main domain controls access to the hardware device by the IO request according to a resource needed to perform the IO request, wherein the resource needed to perform the IO request is a central processing unit (CPU) time needed to perform the IO request, and wherein the main domain further comprises an access control module to compare the resource needed to perform the IO request with a reference value which is a threshold value for CPU usage available for the hardware device, prior to processing the IO request, determine, prior to processing the IO request, an amount of the IO request to be processed corresponding to the reference value when the resource needed to perform the IO request is greater than the reference value and corresponding to the amount of the IO request when the resource needed to perform the IO request is less than or equal to the reference value, process the determined amount of the IO request to be processed during a scheduling period and, when the resource needed to perform the IO request is greater than the reference value, block a remaining amount of the IO request during the processing the determined amount of the IO request in the scheduling period and then process the remaining amount of the IO request in a subsequent scheduling period.

9. The virtualization apparatus according to claim 8, wherein the main domain further comprises a back-end driver associated with the hardware device to receive the IO request from the sub domain.

10. The virtualization apparatus according to claim 8, wherein the main domain further comprises an IO accounting unit to calculate the resource needed to perform the IO request.

11. The virtualization apparatus according to claim 8, wherein the resource needed to perform the IO request further comprises a size of the IO request.

12. The virtualization apparatus according to claim 8, wherein the main domain further comprises an access control module to check a remaining capacity of a battery and block the access to the hardware device if the remaining capacity of the battery less than a second reference value.

13. The virtualization apparatus according to claim 8, wherein the main domain comprises an access control module to detect a malicious program code and block an access to the hardware device by the IO request caused by the malicious program code.

14. The virtualization apparatus according to claim 8, wherein the virtualization apparatus is a consumer electronic device.

15. The virtualization apparatus according to claim 13, wherein the virtualization apparatus is a mobile device.

16. The virtualization apparatus according to claim 8, wherein the system resource unit comprises a plurality of hardware devices and the main domain comprises a plurality of native drivers for the hardware devices.

17. The virtualization apparatus according to claim 8, wherein the access control module, prior to processing the IO request, determines an attack by malware when the resource needed to perform the IO request is greater than or equal to a predetermined value and intercepts the IO request when the attack by malware is determined.

* * * * *